US006997461B2

(12) United States Patent
Smith et al.

(10) Patent No.: US 6,997,461 B2
(45) Date of Patent: Feb. 14, 2006

(54) HIGH SPEED HIGH PRESSURE ROTARY

(75) Inventors: Timothy Troy Smith, Vandalia, IL (US); Larry J. Castleman, Fort Wayne, IN (US)

(73) Assignee: Trelleborg Sealing Solutions U.S., Inc., Fort Wayne, IN (US)

( * ) Notice: Subject to any disclaimer, the term of this patent is extended or adjusted under 35 U.S.C. 154(b) by 0 days.

(21) Appl. No.: 10/196,405

(22) Filed: Jul. 16, 2002

(65) Prior Publication Data

US 2003/0015843 A1 Jan. 23, 2003

Related U.S. Application Data

(60) Provisional application No. 60/306,113, filed on Jul. 17, 2001.

(51) Int. Cl.
*F16J 15/32* (2006.01)

(52) U.S. Cl. .................. 277/549; 277/553; 277/560; 277/589

(58) Field of Classification Search ............... 277/549, 277/553, 560, 589
See application file for complete search history.

(56) References Cited

U.S. PATENT DOCUMENTS 2,736,585 A  2/1956  Riesing
3,108,815 A  10/1963  Haynie et al.
3,455,564 A  7/1969  Dega
3,477,731 A  11/1969  Workman
4,311,316 A  1/1982  Cather, Jr.
4,427,206 A  1/1984  Sugiyama
4,504,067 A  3/1985  Cather, Jr.
4,526,384 A  7/1985  Riley, Jr.
4,660,839 A  4/1987  Mitumaru
5,326,112 A  7/1994  Paykin
5,348,314 A  9/1994  Antonini
5,975,538 A  11/1999  Krause et al.
6,029,980 A  2/2000  Downes
6,209,879 B1  4/2001  Mizunoya et al.
6,520,506 B1 *  2/2003  Reinhardt et al. .......... 277/549

FOREIGN PATENT DOCUMENTS

GB  1042508  9/1966
GB  1298925  4/1970
GB  1429939  6/1972
GB  1457261  3/1973
GB  2150237  6/1985

\* cited by examiner

*Primary Examiner*—Enoch E. Peavey
(74) *Attorney, Agent, or Firm*—Randall J. Knuth

(57) ABSTRACT

A seal system for use in high speed, high pressure applications including a rigid retainer and a resilient body covering the retainer having pressure balancing control. Reduced clearance of the metal case retainer prevents seal extrusion.

18 Claims, 3 Drawing Sheets

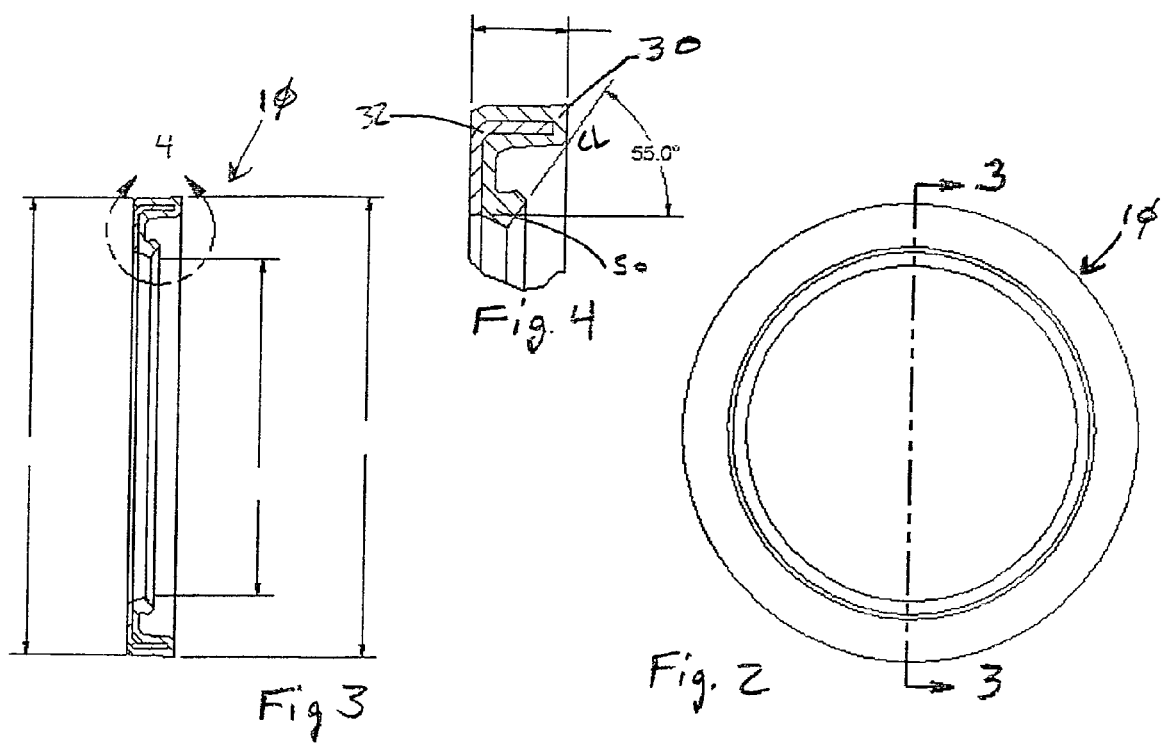

HIGH SPEED HIGH PRESSURE ROTARY

This application claims the benefit under Title 35, United States Code §119(e) of any U.S. application No. 60/306,113 filed on Jul. 17, 2001.

BACKGROUND OF THE INVENTION

1. Field of the Invention

This invention relates generally to radial lip seals, and more particularly, to radial lip seals which can accommodate shaft deflection in an environment in which the shaft rotates at high speed, and under high torque conditions and in which the fluid being sealed attains high pressures.

2. Description of the Related Art

Lip seals are usually molded of a resilient elastomeric or polymeric material. They are secured in fluid tight relation to a housing and surround a rotating shaft which extends through an aperture in the housing wall. The sealing lip is in sealing relationship to the shaft to contain the fluid in the housing.

Lip seal's components or elements include a rigid case or retainer to add rigidity and to unitize the seal assembly. The case also aids in the installation, withdrawal and retention of the seal relative to the housing. The resilient body includes a secondary seal to seal against the housing and one or more resilient sealing lips which are maintained in sealing contact with the shaft.

Lip seals experience a wide variety of uses in which operating temperature and pressure conditions, expected shaft speeds, and the make-up of the medium to be contained dictate the requirements of a particular construction. Typically, however, the rigid component or retainer is formed of hard plastic, such as phenolic, steel or stainless steel and the resilient lips are defined by elastomeric or polymeric members such as molded rubber, polytetrafluoroethylene or other known materials. The resilient element may be molded as a single body or may comprise a plurality of separate elements connected together in fluid tight relation.

The nature of lip seal applications expose the seal to conditions of significant shaft movement relative to the surrounding housing. Shaft deflection relative to either the housing or the bore results in a wobble of the shaft during rotation of the shaft, also referred to as shaft run-out. A significant degree of shaft run-out often challenges the effectiveness of the lip seal.

Specific applications for lip seals may include automotive, appliance and industrial applications. Certain applications subject lip seals to extreme service conditions such as in air conditioning compressors, where the shaft is typically driven by a belt and pulley through an electric clutch, and in oil pumps which generally pressurize oil to high pressures, to thereby permit effective circulation of the oil through the engine and oil filter. Compressor and oil pump design typically results in shaft wobble, bending distortion and misalignment of the shaft axis relative to the housing aperture. Ideally, the lip seal assembly takes into account the established tolerances of the devices in which the lip seal is used in order to minimize the associated manufacturing costs.

Efforts to provide a lip seal to accommodate shaft run-out or misalignment include use of extended conical shapes, multiple lips and other variations and alterations of the resilient element. An effective arrangement is disclosed in U.S. Pat. No. 5,503,408, issued Apr. 2, 1996, and commonly assigned with this invention to John Crane Inc., Morton Grove, Ill. The seal disclosed and claimed in U.S. Pat. No. 5,503,408 embodies multiple resilient lips which provide for an auxiliary or alignment lip interposed between the shaft and the sealing lip for centering the lip seal. Under conditions of misalignment, the auxiliary lip contacts the underside of the primary sealing lip and causes a displacement of that lip in the direction of displacement of the shaft relative to the center of its associated housing bore. Displacement of the auxiliary lip causes the primary sealing lip to "follow" the shaft and, thereby, maintain the integrity of its sealing relation to the shaft. The lip seal described in U.S. Pat. No. 5,503,408 is used in relatively low pressure type applications. U.S. Pat. No. 5,975,538 uses an inner support member to accomplish enhanced sealing.

In the event that the fluid being sealed attains high pressures, the lip seal becomes subject to deformation from axially directed pressure forces, resulting from the high pressures acting on the radial area of the lip seal, which press the radial sealing lip against the bearing. At high pressures, the radial seal lip is further subject to folding over at the shaft, thereby resulting in a loss of sealing capacity.

To some extent, bearing members which are utilized in the efforts and examples described above maintain seal lip centering and also contain the seal lip in the desired orientation and position between the bearing and the high pressure fluid being sealed. However, bearings, by the nature of their construction and function, extend from the seal lip and provide rigid axial support to the retainer member relative to the shaft. In most instances, the outer diameter of the bearing is flush against the inner diameter of the rigid retainer member, so that any shaft deflection causes the bearing to impart that deflection to the retainer, thereby maintaining a predetermined relative orientation between the lip seal and the rotating shaft. Dampening action of a resilient mounting between the bearing and the retainer member absorbs the majority of the deflection. However, even in the resilient mounting example, the abutment of the bearing member with the resilient retainer subjects the bearing to continual repeated stress, which over extended periods of time can cause the deterioration and destruction of the bearing.

The present invention addresses the needs of the seals in some applications to accommodate a greater amount of pressure and inflexibility which results from the increased pressure sealed fluid environments. The ability of the improved lip seal according to the present invention to accommodate great pressures also allows for the elimination of expensive case pressure drain systems that are required in some high pressure applications.

SUMMARY OF THE INVENTION

The present invention is directed to a unitary lip seal assembly which includes a rigid retainer and a resilient member secured thereto with at least one generally radially directed lip for sealing engagement with an associated shaft. The retainer member defines a radial support surface for maintaining the radial sealing lip intermediate the radial support surface and the high pressure medium being sealed. The retainer member is shaped and dimensioned and has an inner diameter adapted to maintain a predetermined spatial separation between the retainer member inner diameter portion and the shaft extending portion of the support member irrespective of the operational conditions, such as amount of shaft deflection, or of the pressure of the medium being sealed.

The rigid metal container case has a sharp corner at the inside diameter facing the open end and resilient member.

This sharp corner prevents the lip of the resilient member from wedging between the case and the shaft and then extruding.

The rigid container further is not totally encased by the resilient member. Therefore, the back surface of the rigid retainer is in direct thermal contact with the housing or end plate. This increases thermal conductivity between a seal and the housing and allows for dissipation of heat that builds up within the seal system.

Another portion of the invention is that the geometry of the seal lip at the flex and head area is pressure balanced. This pressure balancing is a combination of particular angles and surface areas and allows the pressure to exert force vectors that offset some of the force that can lift the lip from the rotating shaft. A combination of particular geometrical shapes permits the creation of a new class of vector forces upon the seal lip area.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a front view, showing the seal assembly of the present invention uninstalled in a housing;

FIG. 3 is a sectional side view of the seal assembly shown in FIG. 2, the cross-section taken approximately along the line 3—3;

FIG. 4 is an enlarged section of FIG. 3 about line 4; and

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
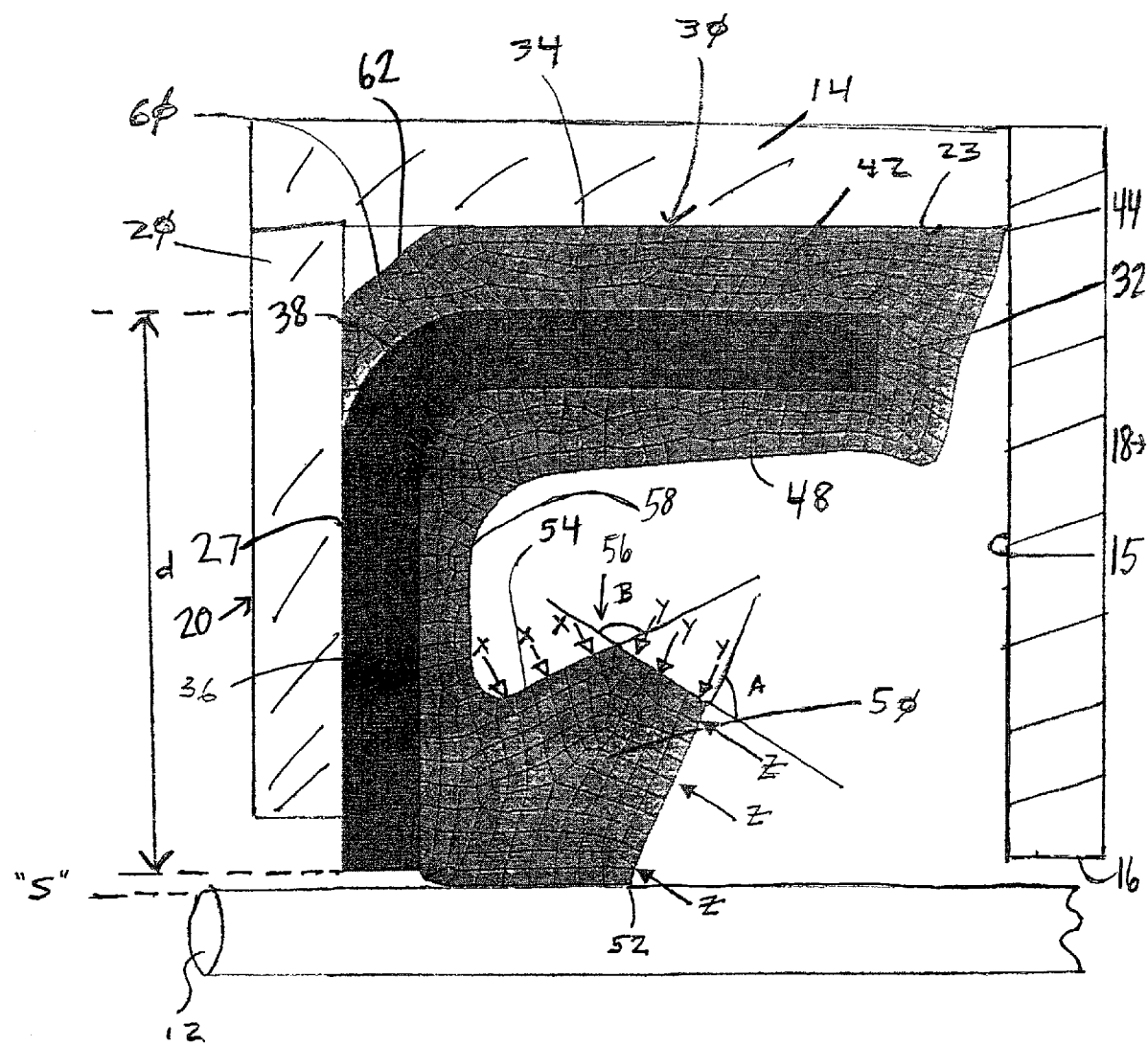
FIG. 1 is a sectional view of an installed seal assembly according to the present invention.

Referring to FIGS. 1 through 3, a lip seal assembly, generally designated 10, is illustrative of the principles of the present invention. Lip seal assembly 10 comprises several components, and is shown in FIG. 1. The seal assembly illustrated in FIG. 1 is rendered in an assembled and installed condition. FIG. 1 illustrates lip seal assembly 10 installed in a hydraulic application, such as a motor or oil pump, and disposed about a shaft 12 which extends through an aperture in the pump housing 14. The invention is particularly well suited for high speed high pressure hydraulic applications.

The aperture is defined by a cylindrical wall 16 which surrounds shaft 12 in spaced relation. Pump housing 14 is shown in partial section in FIG. 2, with shaft 12 extending through the aperture. Lip seal assembly 10 seals the aperture to minimize leakage from the pump housing even when the oil is under great pressure which are generated by the rotor (not shown) which is attached to shaft 12. It is understood by those having skill in the art that all of the seal members shown in FIG. 1 are annular members which are disposed concentrically with shaft 12. The elements are shown in the drawing figures in partial cross-sectional views for convenience. That is, those portions of lip seal assembly 10 and housing 14 which extend therebelow are not shown. These elements would be essentially identical to the portions above the centerline, and the convention is to illustrate only one-half of the members to allow illustration in greater detail.

Housing 14 defines internal chamber 18 which surrounds shaft 12 and is filled with a lubricant, such as oil. When the shaft is rotating together with the attached rotor (not shown), pressure is generated within chamber 18. Oil pump components, such as the rotor (not shown), are disposed inboard of housing 14 and operate to generate pressure of the oil which is then pumped through the lubrication system of the hydraulic system or other application requiring a hydraulic pump or motor for low speed, high pressure applications.

Lip seal assembly 10 is annularly disposed axially outboard of housing 14 and adjacent aperture cylindrical wall surface 16. Lip seal assembly 10 maintains a seal at the aperture and produces a sealing relation between the surface of shaft 12 and radial surface 15 of housing 14. Seal assembly 10 separates chamber 18 from the environment which is external to housing 14.

Lip seal assembly 10 is retained in place by a conventional end plate assembly as known in the art. The end plate assembly comprises generally an annular end plate 20 which is removable.

The details of lip seal assembly 10, in an installed condition, are illustrated in FIG. 1. Lip seal assembly 10 includes an annular resilient seal body 30 bonded to a rigid retainer 32. Resilient seal body 30 may be formed from an elastomeric material, such as hard rubber, and rigid retainer 32 may be formed from a metallic material, e.g. steel.

Figure 5:
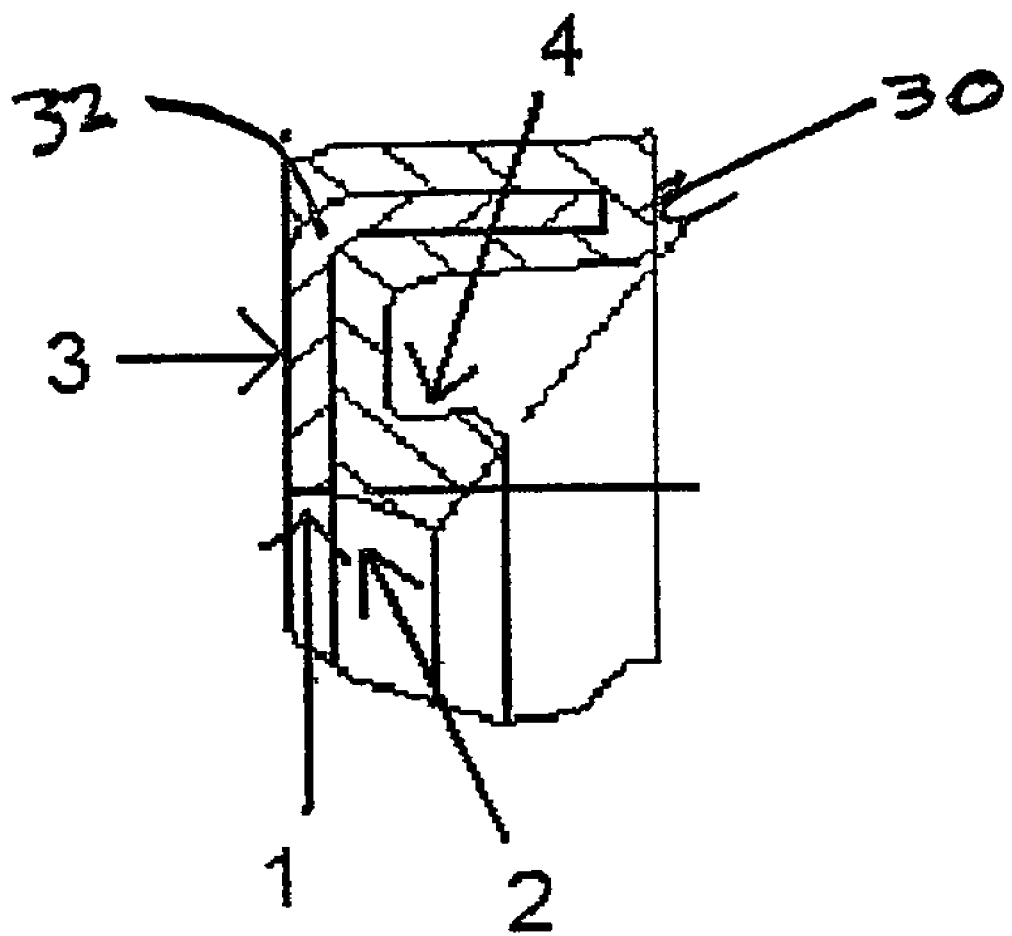
FIG. 5 is an enlarged sectional view of FIG. 4.

Rigid retainer 32 is an annular, ring-like structure which includes an axially extending collar 34 at the outer diameter, a shortened radially extending flange 36 at the inner diameter to flange 36. A curved connecting portion 38 extends radially inwardly from collar 34 and connects collar 34 to flange 36. In cross-section, rigid retainer 32 appears in the shape of an "L", or as a widened "V" as is shown in FIGS. 1, 4 and 5.

Resilient seal body 30 is an integral elastomeric or polymeric element, as shown, and is formed by a molding or injection process. Typically, the forming of resilient seal body 30 and its bonding to rigid retainer 32 occur simultaneously during the molding process. Resilient seal body 30 includes an annular ring portion 42 which is bonded to the outer diameter surface of the annular, axially extending collar 34. Ring portion 42 includes a circumferential extension section 44 which is formed at a corner of resilient seal body 30 on an outer surface thereof and may be flared at each end to provide a better interference fit in the installed condition.

Installation of the seal as illustrated in FIG. 1 causes extension section 44 to sealingly engage the annular cylindrical wall 23 of housing 14. In order to ensure a fluid tight seal between the outer diameter wall of resilient seal body 30 and the inner diameter of annular cylindrical wall 23, the outer diameter of extension section 44 is formed to be slightly larger than the inner diameter of annular cylindrical wall 23. A limited amount of compression of extension section 44 and of ring portion 42 occurs upon installation, which aids in creating a fluid tight seal.

Referring again to FIG. 1, a shallow layer of the elastomeric material which defines a central covering portion 48 extending radially inwardly from ring portion 42 and is disposed on the inner curved section of connecting portion 38. Preferably, central covering portion 48 is molded onto connecting portion 38 so that the elastomeric material encloses and isolates rigid retainer 32 from the process fluid contained under pressure within internal chamber 18. This aids in avoiding corrosion of rigid retainer 32. The opposite side (outside) is in thermal connection with annular end plate 20 and preferably housing 14.

Extending radially inwardly from the central covering portion 48 is a sealing lip 50. Sealing lip 50 is integral with the central covering portion 48 and is molded onto the short radially extending flange 36 of rigid retainer 32. Sealing lip 50 comprises a main body and a contacting point 52 for sealing contact with the surface of shaft 12. In the uninstalled condition, sealing lip 50 extends at an angle in a radially inward direction relative to the center line CL and axially away from the body of the seal assembly 10 toward the direction where the pressurized hydraulic fluid would be disposed as shown in FIG. 4, preferably 55°±10°.

Extending axially and radially from resilient seal body 30 is a projection portion 60 which extends axially of the end of collar 34 of rigid retainer 32 for a predetermined distance. Projection portion 60 acts to maintain the desired axial spacing of lip seal assembly 10 in relation to a radially extending wall 27 and radial surface 15 of annular end plate 20 and housing 14, respectively. Projection portion 60 may include a chamfer 62, as shown, to permit easier installation of lip seal assembly 10 within annular end plate 20.

Resilient seal body 30 is disposed between annular end plate 20, annular cylindrical wall 23, and radial surface 15 defining the space accepting lip seal assembly 10. The outer diameter of ring portion 42 seals against annular cylindrical wall 23 and sealing lip 50 seals against shaft 12. The spacing S between flange 36 and shaft 12 is critical for rigid retainer 32 to act as a single and sole backup ring for lip seal assembly 10. Flange 36 has a height of d as shown in FIG. 1. The spacing S from shaft 12 must be within 0.0 to 10% of the length of d for most effective operation. An non-chamfered corner is also of assistance in preventing extrusion. Four to eight thousandths of an inch is preferred for space S.

Resilient seal body 30 is molded onto and bonded to rigid retainer 32. Resilient seal body 30 and rigid retainer 32 together define a radially fixed mounting for sealing lip 50 which is able to angularly shift its position to accommodate shaft deflection while at all times maintaining a seal against the surface of shaft 12. In the installed position of seal assembly 10 (FIGS. 2 and 3), contacting point 52, which extends circumferentially around the shaft 12, contacts the surface of shaft 12. Similarly, extension section 44 of ring portion 42 contacts annular cylindrical wall 23 and possibly radial surface 15 of housing 14 to provide a fluid tight seal against housing 14.

An annular undercut or recess 54 is formed in the resilient seal body 30 which permits controlled flexing or bending of sealing lip 50 as the shaft runout causes radial movement or shaft deflection upon rotation. Walls 56, 58 forming the undercut are positioned, dimensioned and oriented to cause sealing lip 50 to pivot about an annular circumference which is approximately disposed about flange 36.

As indicated in FIG. 5, particularly surfaces indicated as 1, 2, and 3 create the vector forces as indicated in FIG. 1, shown with arrows X, Y, Z relative to lip faces X', Y', and Z', respectively. During operation, pressure on the surfaces create the vector forces X which push the sealing lip 50 down to shaft 12. Such vector forces also push the seal to the right in FIG. 1. Pressure forces Y created during operation push the seal down to shaft 12 and further push sealing lip 50 to the left, as shown in FIG. 1. Vector forces Z created during seal operation push the seal up from shaft 12 and towards the left of the seal in FIG. 1. The creation of particular surfaces along with the orientation of the apex angle A (formed at and associated with a first apex A' of sealing lip 50) of approximately 90°±20° creates the new novel X vector forces as shown in FIG. 1.

An apex angle A of 90°±10° is preferred. Apex angle B (formed at and associated with a second apex B' of sealing lip 50) has a preferred angle of approximately 120°±10°. The shape of rigid retainer 32 and its disposition fairly close to shaft 12 provides a rigid base, so that sealing lip 50 will provide an effective seal without failure for long periods of time.

Other modifications may become apparent to a person of ordinary skill in the art upon achieving an understanding of the inventive concept described herein. Accordingly, this invention is not limited by the illustrated embodiments shown and described herein, but is limited only by the following claims.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly for disposition in sealing relation between an aperture formed in a housing wall and a rotatable shaft extending through the aperture to contain fluid within the interior of the housing, said seal assembly comprising:
   an annular rigid retainer member having an outer diameter axially extending portion and an inner diameter portion, said inner diameter portion configured for extending toward the shaft; and
   a resilient annular seal body secured to said retainer member, said seal body having a sealing lip adapted for sealing engagement with the shaft and an axially extending outer diameter body portion adapted for sealing against the housing, said axially extending outer diameter body portion being disposed adjacent said outer diameter axially extending portion of said retainer, said sealing lip having a shaft contacting point and a lip surface disposed radially outward of said shaft contacting point, the lip surface extending from said shaft contacting point on a hydraulic side thereof, said sealing lip being suitably configured such that when said sealing lip being in a compression state during installation of said seal assembly, the lip surface of said sealing lip includes a first face, a second face contiguous with the first face, and a third face contiguous with the second face, the first face being disposed between said shaft contacting point and the second face, the second face being angularly inclined with respect to the first face, the second face being angularly inclined with respect to the third face.

2. The seal assembly in claim 1, wherein said retainer member is L-shaped.

3. The seal assembly in claim 1, wherein the first face and the second face being joined to define a first apex forming an angle of 90 degrees +/−10 degrees.

4. The seal assembly in claim 3, wherein the second face and the third face being joined to define a second apex forming an angle of 120 degrees +/−10 degrees.

5. The seal assembly in claim 1, wherein the inclination of the second face relative to the first face defining a first angular convex portion, the inclination of the second face relative to the third face defining a second angular convex portion, the second angular convex portion being disposed axially outward of the first angular convex portion, the second angular convex portion facing generally radially outward.

6. The seal assembly as recited in claim 1, wherein each of the first face, the second face, and the third face being respectively configured to be generally planar, when said sealing lip being in the compression state during installation of said seal assembly.

7. The seal assembly as recited in claim 1, wherein, when said sealing lip being in the compression state during installation, the first face being inclined at an acute angle relative to a longitudinal axis of said shaft, the second face being inclined at an obtuse angle relative to the longitudinal axis of said shaft, and the third face being inclined at an obtuse angle relative to the longitudinal axis of said shaft.

8. The seal assembly as recited in claim 1, wherein the second face being disposed axially inward of the third face, the third face being inclined radially outward while extending axially inward, and the second face being inclined radially inward while extending axially inward.

9. The seal assembly as recited in claim 1, wherein the second face and the third face each facing generally radially outward relative to said shaft.

10. A seal assembly for disposition in sealing relation between an aperture formed in a housing wall and a rotatable shaft extending through the aperture to contain fluid within the interior of the housing, said seal assembly comprising:
   an annular rigid retainer member having an outer diameter axially extending portion and a generally radially extending inner diameter portion having a free terminal end at a radially innermost portion thereof, said inner diameter portion of said retainer member having a back surface, said back surface available for direct engagement with the housing, said inner diameter portion being configured to extend close enough to the shaft so that said retainer member is arranged to act as a sole backup ring for said seal assembly; and
   a resilient annular seal body secured to said retainer member, said seal body having a sealing lip adapted for sealing engagement with the shaft and an axially extending outer diameter body portion adapted for sealing against the housing, said axially extending outer diameter body portion being disposed adjacent and surrounding said outer diameter axially extending portion of said retainer, the sealing lip of said seal body having an axially outermost terminus disposed at or prior to the radially extending inner diameter portion of said rigid retainer member during installation of said seal assembly, to enable the free terminal end of the radially extending inner diameter portion of said rigid retainer member to be disposed in confronting facing Opposition to said shaft during installation.

11. The seal assembly as recited in claim 10, wherein said sealing lip having a shaft contacting point and a lip surface disposed radially outward of said shaft contacting point, the lip surface extending from said shaft contacting point on a hydraulic side thereof, said sealing lip being suitably configured such that when said sealing lip being in a compression state during installation of said seal assembly, the lip surface of said sealing lip includes a first face, a second face contiguous with the first face, and a third face contiguous with the second face, the first face being disposed between said shaft contacting point and the second face, the second face being angularly inclined with respect to the first face, the second face being angularly inclined with respect to the third face.

12. A seal assembly for disposition in sealing relation between an aperture formed in a housing wall and a rotatable shaft extending through the aperture to contain fluid within the interior of the housing, said seal assembly comprising:
   an annular rigid retainer member having an outer diameter axially extending portion and an inner diameter portion; and
   a resilient annular seal body secured to said retainer member, said seal body having a sealing lip adapted for sealing engagement with the shaft and an axially extending outer diameter body portion adapted for sealing against the housing, said sealing lip having a shaft contacting point and a lip surface disposed radially outward of said shaft contacting point, the lip surface extending from said shaft contacting point on a hydraulic side thereof said sealing lip being suitably configured such that when said sealing lip being in a compression state during installation of said seal assembly, the lip surface of said sealing lip includes a first face, a second face contiguous with the first face, and a third face contiguous with the second face, the first face being disposed between said shaft contacting point and the second face, the second face being angularly inclined with respect to the first face, the second face being angularly inclined with respect to the third face.

13. The seal assembly as recited in claim 12, wherein the third face depending radially outward while extending axially inward, the second face depending radially inward while extending axially inward.

14. A seal assembly for disposition in sealing relation between an aperture formed in a housing wall and a rotatable shaft extending through the aperture to contain fluid within the interior of the housing, said seal assembly and the rotatable shaft having a fluid film therebetween, said seal assembly comprising:
   an annular rigid retainer member having an outer diameter axially extending portion and an inner diameter portion; and
   a resilient annular seal body secured to said retainer member, said seal body having a sealing lip adapted for sealing engagement with the shaft and an axially extending outer diameter body portion adapted for sealing against the housing, said sealing lip having a shaft contacting portion and a lip surface disposed generally radially outward of said shaft contacting portion, said sealing lip being suitably configured such that during installation of said seal assembly, the lip surface of said sealing lip features a first angular convex portion and a second angular convex portion contiguous with the first angular convex portion, the first angular convex portion and the second angular convex portion being disposed at a hydraulic side of said shaft contacting portion.

15. The seal assembly as recited in claim 14, wherein the lip surface of said sealing lip includes a first face, a second face contiguous with the first face, and a third face contiguous with the second face, the first face being disposed between said shaft contacting portion and the second face, the second face being inclined with respect to the first face to define the first angular convex portion, the second face being inclined with respect to the third face to define the second angular convex portion.

16. The seal assembly as recited in claim 15, wherein the third face depending radially outward while extending axially inward, the second face depending radially inward while extending axially inward.

17. A seal assembly for disposition in sealing relation between an aperture formed in a housing wall and a rotatable shaft extending through the aperture to contain fluid within the interior of the housing, said seal assembly comprising:

an annular rigid retainer member having an outer diameter axially extending portion and an inner diameter portion; and a resilient annular seal body secured to said retainer member, said seal body having a sealing lip adapted for sealing engagement with the shaft and an axially extending outer diameter body portion adapted for sealing against the housing, said sealing lip having a shaft contacting point configured for sealing contact with the rotatable shaft, said sealing lip further having a lip surface disposed radially outward of said shaft contacting point, the lip surface extending from said shaft contacting point on a hydraulic side thereof, said sealing lip being suitably configured such that during installation of said seal assembly, the lip surface of said sealing lip includes a first face, a second face contiguous with the first face, and a third face contiguous with the second face, the first face being disposed between said shaft contacting point and the second face, the second face being inclined with respect to the first face to define a first angular convex portion, the second face being inclined with respect to the third face to define a second angular convex portion.

18. The seal assembly as recited in claim 17, wherein the third face depending radially outward while extending axially inward, the second face depending radially inward while extending axially inward.

* * * * *